(12) United States Patent
Morita et al.

(10) Patent No.: US 6,871,907 B2
(45) Date of Patent: Mar. 29, 2005

(54) SADDLE FOR BICYCLE AND DRIVER SUPPORTING STRUCTURE FOR BICYCLE

(75) Inventors: Kenji Morita, Saitama (JP); Koji Mizuta, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/401,745

(22) Filed: Mar. 31, 2003

(65) Prior Publication Data

US 2003/0222488 A1 Dec. 4, 2003

(30) Foreign Application Priority Data

Apr. 22, 2002 (JP) .......................... 2002-119413
May 31, 2002 (JP) .......................... 2002-160826

(51) Int. Cl.[7] .............................................. B60N 2/38
(52) U.S. Cl. .................... 297/195.1; 297/214; 297/215; 297/215.16
(58) Field of Search .............................. 297/195.1, 214, 297/215.1, 215.16

(56) References Cited

U.S. PATENT DOCUMENTS

| | | | | |
|---|---|---|---|---|
| 3,432,204 A | * | 3/1969 | Brilando | 297/214 |
| 5,076,642 A | * | 12/1991 | Beylet et al. | 297/215.1 |
| 5,362,126 A | * | 11/1994 | Bontrager | 297/195.1 |
| D368,242 S | * | 3/1996 | Camfield et al. | D12/111 |
| 5,791,730 A | * | 8/1998 | Hoffacker | 297/195.1 |
| 5,918,904 A | * | 7/1999 | Hanesworth | 280/852 |
| 6,231,122 B1 | * | 5/2001 | Goldstein | 297/195.1 |

FOREIGN PATENT DOCUMENTS

| | | |
|---|---|---|
| JP | 5147563 | 6/1993 |
| JP | 8281508 | 10/1996 |

* cited by examiner

*Primary Examiner*—Laurie K. Cranmer
(74) *Attorney, Agent, or Firm*—Birch, Stewart, Kolasch & Birch, LLP

(57) ABSTRACT

The opposite side faces of a seat face of a bicycle saddle or seat on which a driver is to be seated expand rearward. The expanded, side faces also expand downward to form a pair of left and right knee grip portions such that the knee grip portions may be held between the inner sides of the knees and/or the inner parts of the thighs of the driver. While the bicycle is moving, the driver can support the bicycle at the handle bar, the pedals and the knee grip portions. Therefore, the driver can improve the stability of the bicycle and maintain a good posture. Further, if the surface area of the knee grip portions is increased, then the knee grip portions can be held readily between the inner sides of the knees and the inner parts of the thighs. Accordingly, a wide range of beneficial operating positions is provided for the aggressive use of the bicycle in applications such as mountain bike racing.

15 Claims, 15 Drawing Sheets

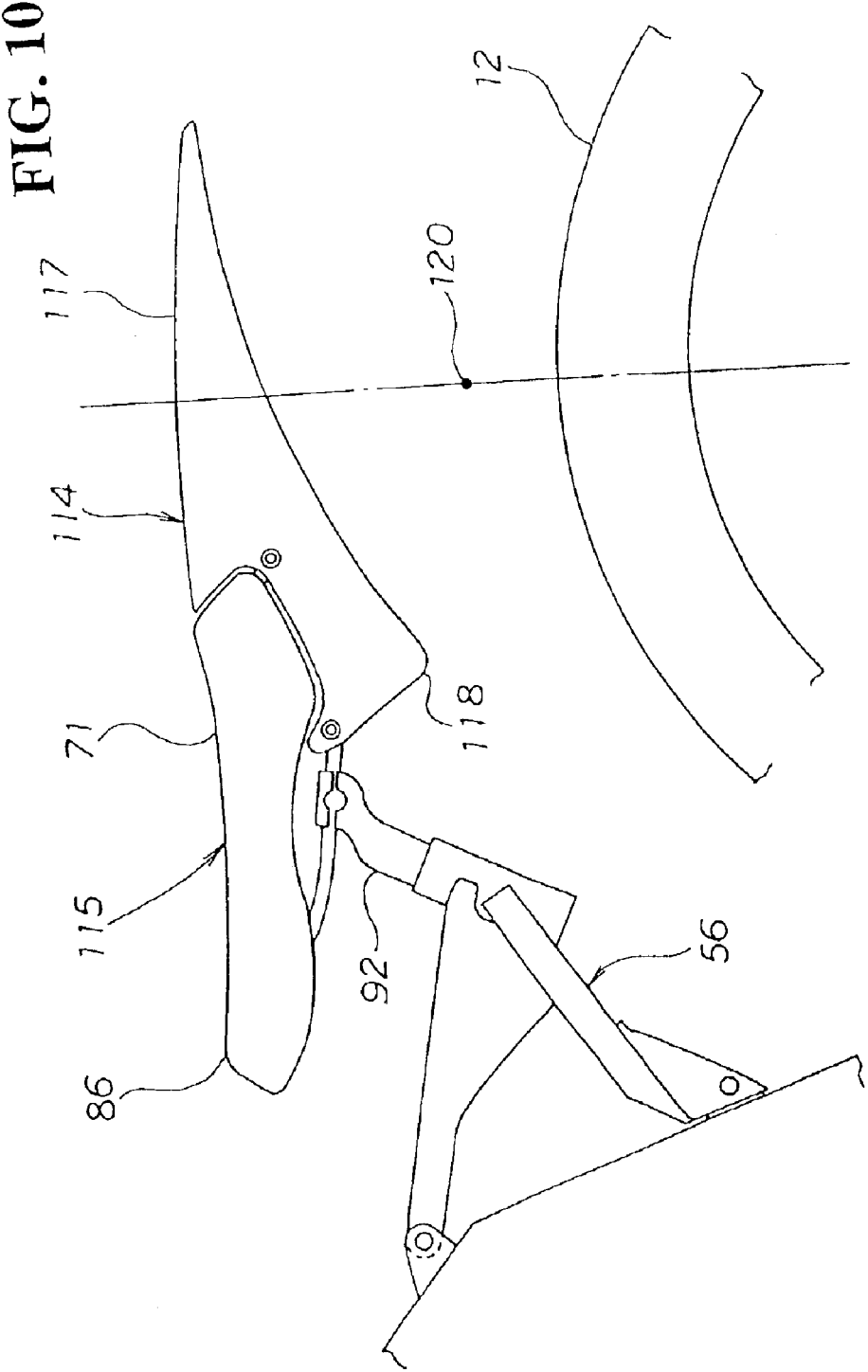

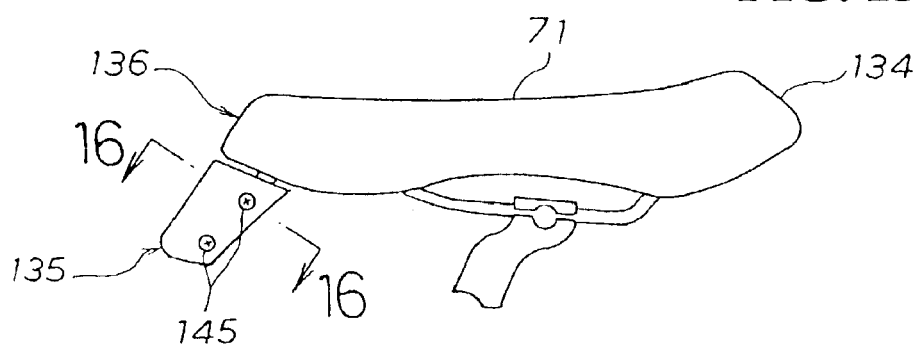
FIG. 15
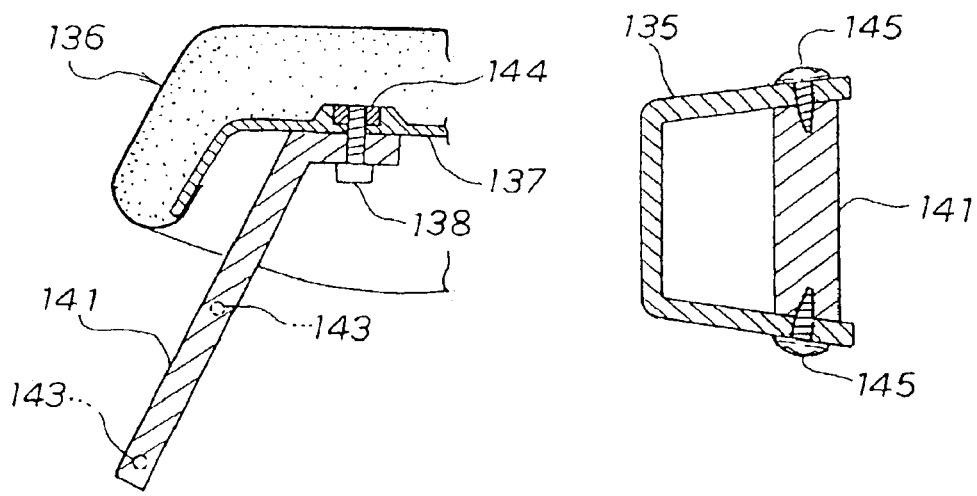
FIG. 16(a)   FIG. 16(b)

SADDLE FOR BICYCLE AND DRIVER SUPPORTING STRUCTURE FOR BICYCLE

CROSS-REFERENCES TO RELATED APPLICATIONS

This nonprovisional application claims priority under 35 U.S.C. § 119(a) on Patent Applications No. 2002-119413 filed in Japan on Apr. 22, 2002, and No. 2002-160826 filed in Japan on May 31, 2002, the entirety of each of which is herein incorporated by reference.

BACKGROUND OF THE INVENTION

1. Field of the Invention

The present invention relates to a saddle for a bicycle and a supporting structure for a driver of a bicycle, and more particularly to a saddle and supporting structure for a bicycle that augments the stability of a bicycle body.

2. Description of the Background Art

Saddles for bicycles have been available in the background art, including the exemplary arrangements discussed in (1) the official gazette of Japanese Patent Laid-open No. Hei 5-147563 "Saddle for a Bicycle" and (2) the official gazette of Japanese Patent Laid-open No. Hei 8-281508 "Frame for a Bicycle."

In FIG. 3 of the document (1) discussed hereinabove, a saddle 1 whose surface is covered with a coating member 20 is described. A side face of the saddle is shown in FIG. 3 of the document (2) discussed hereinabove.

However, the present inventors have determined that the background art suffers from the following disadvantages. For example, where a bicycle is used for a timed, downhill race, e.g., such as a downhill bicycle race competing for time, depending upon the condition of the course, it is necessary for a driver to raise their hip thereof from the saddle to maintain the stability of the bicycle body. In such an instance, if the driver supports the saddle using their body, in addition to supporting the handle grips and the pedals, then the bicycle body can be stabilized effectively and the driver can maintain a good posture. For example, the saddle is held between the inner parts of the thighs, or the driver's waist moved forwardly from the saddle is pressed against a front portion of the saddle so as to support the saddle.

With the saddle 1 as described in document (1), even if the driver tries to support the saddle 1 while the hip is raised from the saddle 1, it is difficult to support the saddle 1 at desired positions with the inner parts of the thighs. Further, even if the driver's waist is used for supporting the saddle, a front portion of the saddle 1 has a projection shape that applies an undesirable high pressure to the driver's waist. Further, no special structure is adopted for maintaining the posture of the driver.

The foregoing similarly applies to the saddle described in document (2). Such a saddle support structure, which is supported by the driver as described above, is not limited to the saddle itself. Any bicycle body portion in the proximity of the saddle that can be held by between the inner parts of the thighs or which can receive the waist in a state wherein the driver raises his/her hip from the saddle is possible as a means of stabilizing the bicycle body. The support portion may be provided in accordance with the physical attributes of the driver, specifications of the bicycle, and so forth.

SUMMARY OF THE INVENTION

The present invention overcomes the shortcomings associated with the background art and achieves other advantages not realized by the background art.

An object of the present invention is to provide a saddle for a bicycle and a supporting structure for the driver of a bicycle that augments the stability of a bicycle body and supports a good posture for the driver.

One or more of these and other objects are accomplished by a saddle for a bicycle, the saddle comprising a saddle body; a seat face of the saddle being provided on the saddle body for supporting a driver of the bicycle, the seat face having side faces and a rear portion; and a pair of left and right knee grip portions, the side faces of the seat face expanding rearward and downward with respect to a central portion of the rear portion to form the pair of left and right knee grip portions, wherein the knee grip portions permit the driver to hold the knee grip portions between inner sides of the knees and inner parts of the thighs of the driver.

One or more of these and other objects are further accomplished by a support structure for a saddle of a bicycle, the support structure comprising a saddle body; a seat face of the saddle being provided on the saddle body for supporting a driver of the bicycle, the seat face having side faces and a rear portion; and an extending piece extending upward is provided on a body frame forward and beneath a front end of the saddle.

The present invention provides one of more of the following advantages over the structure of the background art. In the present invention, while the bicycle is moving, the driver can support the bicycle at the handle bar and the pedals as well as the knee grip portions. Therefore, the driver can augment the stability of the bicycle and can keep a good posture.

The number of parts of the saddle in this configuration can be reduced and the cost of the saddle can be reduced. Further, the saddle on which the knee grip portions are integrally formed can be readily produced. The knee grip portions can be removed when necessary, and the operability of the saddle is improved. Further, the knee grip portions can be mounted readily on an existing saddle, which includes only a seat face.

In addition to the stabilization of the bicycle body by the knee grip portions, splashing of mud and debris by the rear wheel can be prevented. When the driver assumes a posture wherein the hip is moved in a forward direction with respect to the bicycle body from the seat face, the hip or waist is received by the front face of the extension, and the hip or waist can be contacted in a face-to-face contacting relationship with the front face of the extension. Consequently, a high pressure can be prevented from acting upon the hip or waist. Further, the saddle on which the extension is integrally formed integrally can be readily manufactured.

However, the extension can be removed if necessary, and the operability of the saddle can be augmented. If the shape of the stay is changed, then the position of the extension can be changed, and the extension can be disposed in accordance with the driver's preference.

Since the extending piece is provided on the body frame, when the driver assumes a posture wherein the hip is moved in a forward direction with respect to the bicycle body from the seat face of the saddle, the driver's hip or waist is received by the front face of the extending piece such that the hip or waist can be contacted in a face-to-face contacting relationship with the front face of the extending piece. Consequently, a high pressure can be prevented from acting upon the hip or waist.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 10 is a side view of a saddle according to a third embodiment of the present invention;

FIG. 15 is a side view of a saddle according to a fifth embodiment of the present invention;

FIGS. 16(a)–(b) are sectional views of a front portion of the saddle according to the fifth embodiment of the present invention;

DETAILED DESCRIPTION OF THE PREFERRED EMBODIMENTS

Figure 1:
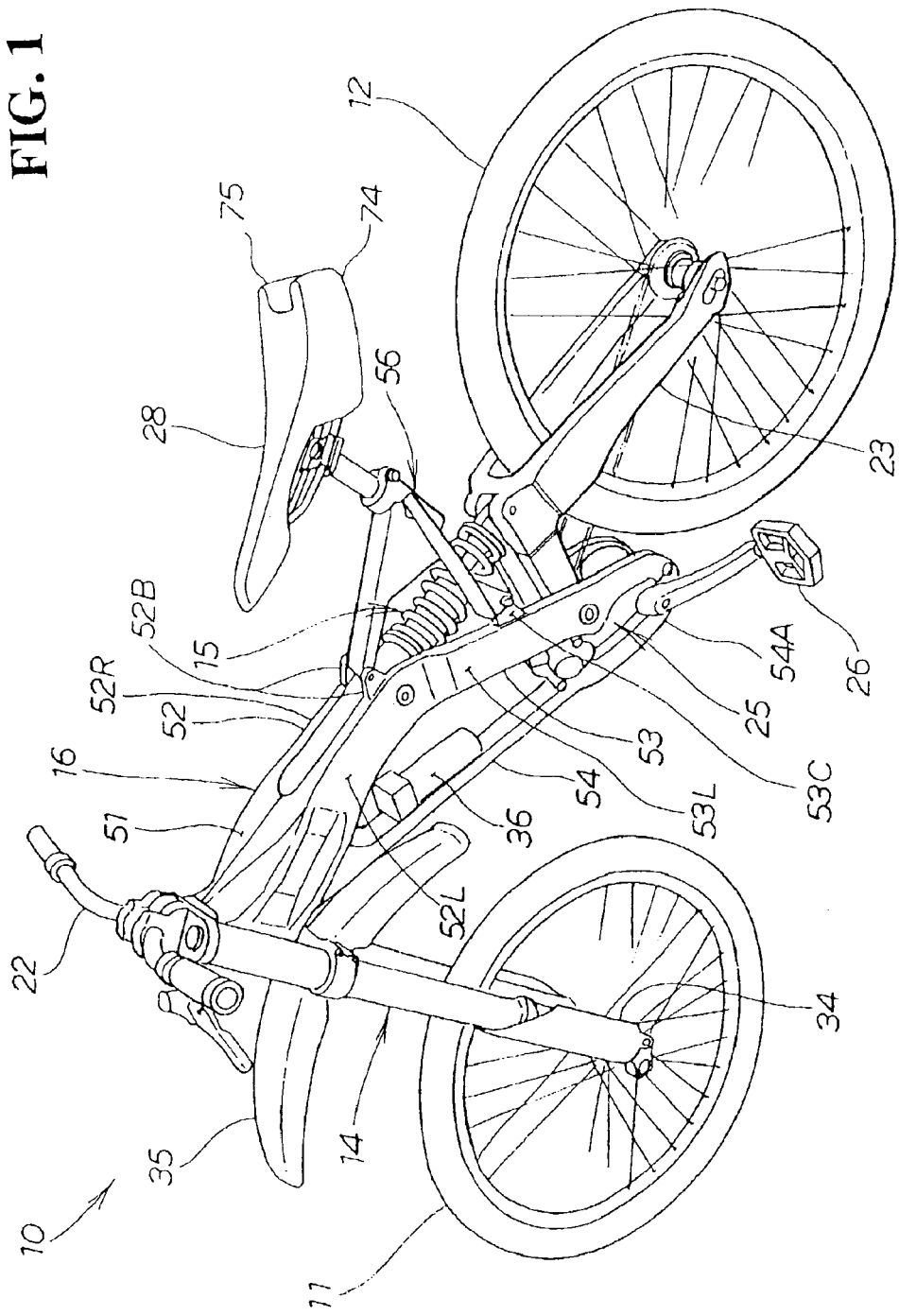
FIG. 1 is a perspective view of a bicycle including a saddle according to a first embodiment of the present invention.

The present invention will hereinafter be described with reference to the accompanying drawings. It is to be noted that the drawings should be viewed in a direction that permits a proper reading of the reference characters.

Figure 2:
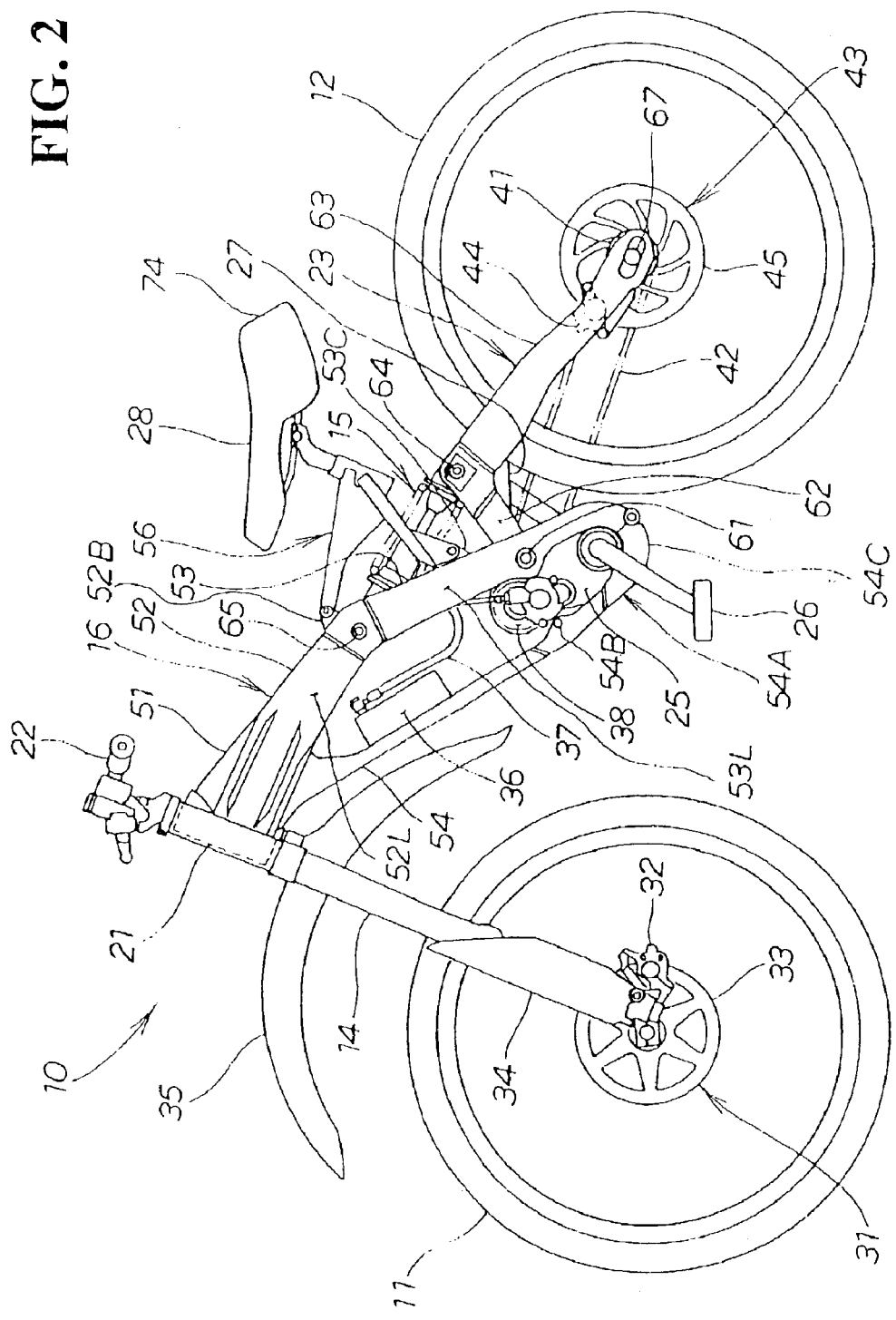
FIG. 2 is a side view of the bicycle including the saddle according to the first embodiment of the present invention.
Figure 3:
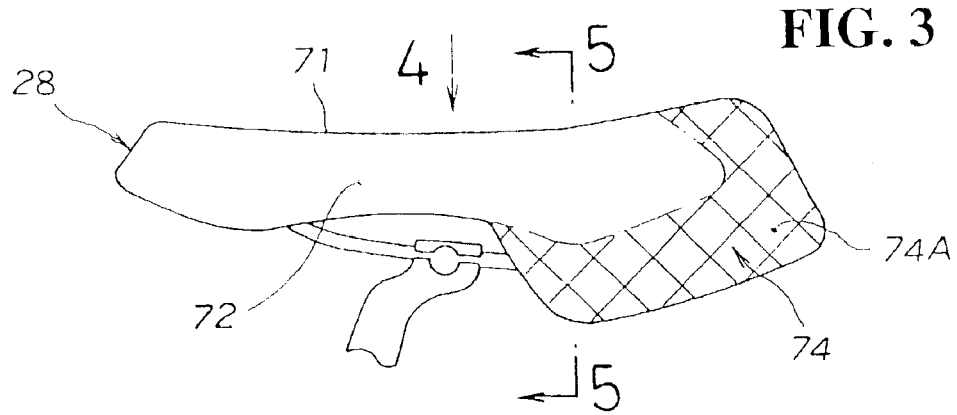
FIG. 3 is a side view of the saddle according to the first embodiment of the present invention.
Figure 4:
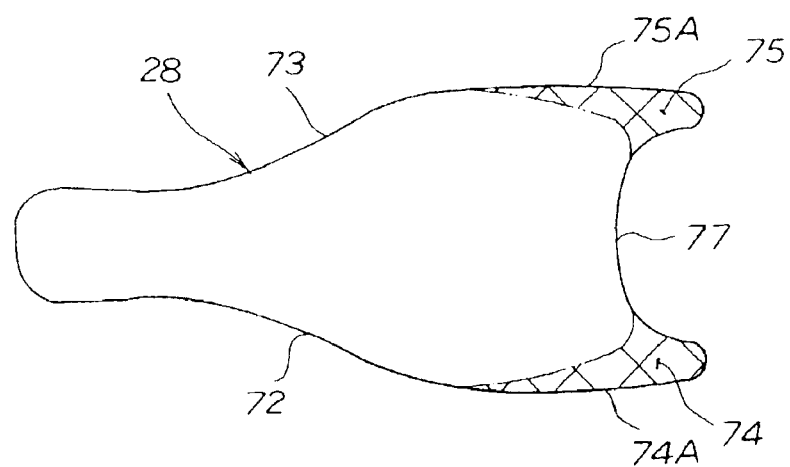
FIG. 4 is a plan view taken along the direction indicated by an arrow mark 4 in FIG. 3.
Figure 5:
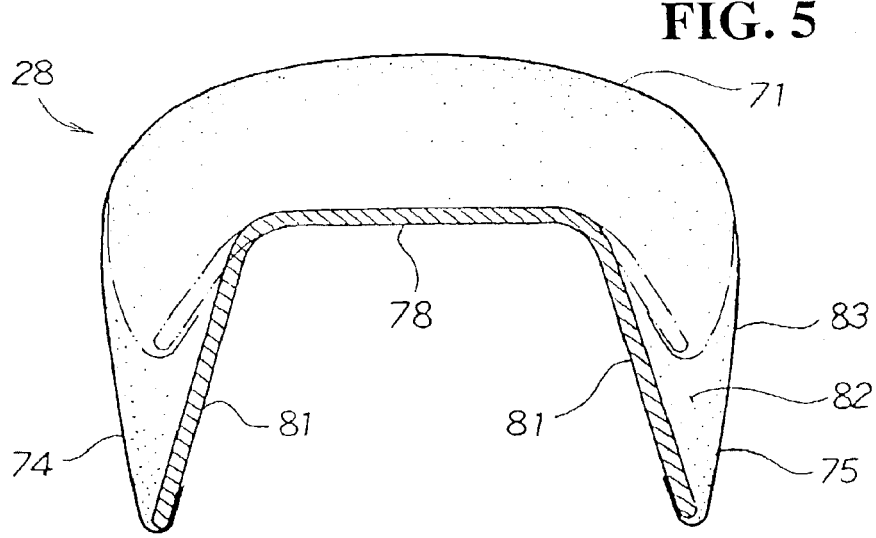
FIG. 5 is a sectional view taken along line 5—5 of FIG. 3.
Figure 6:
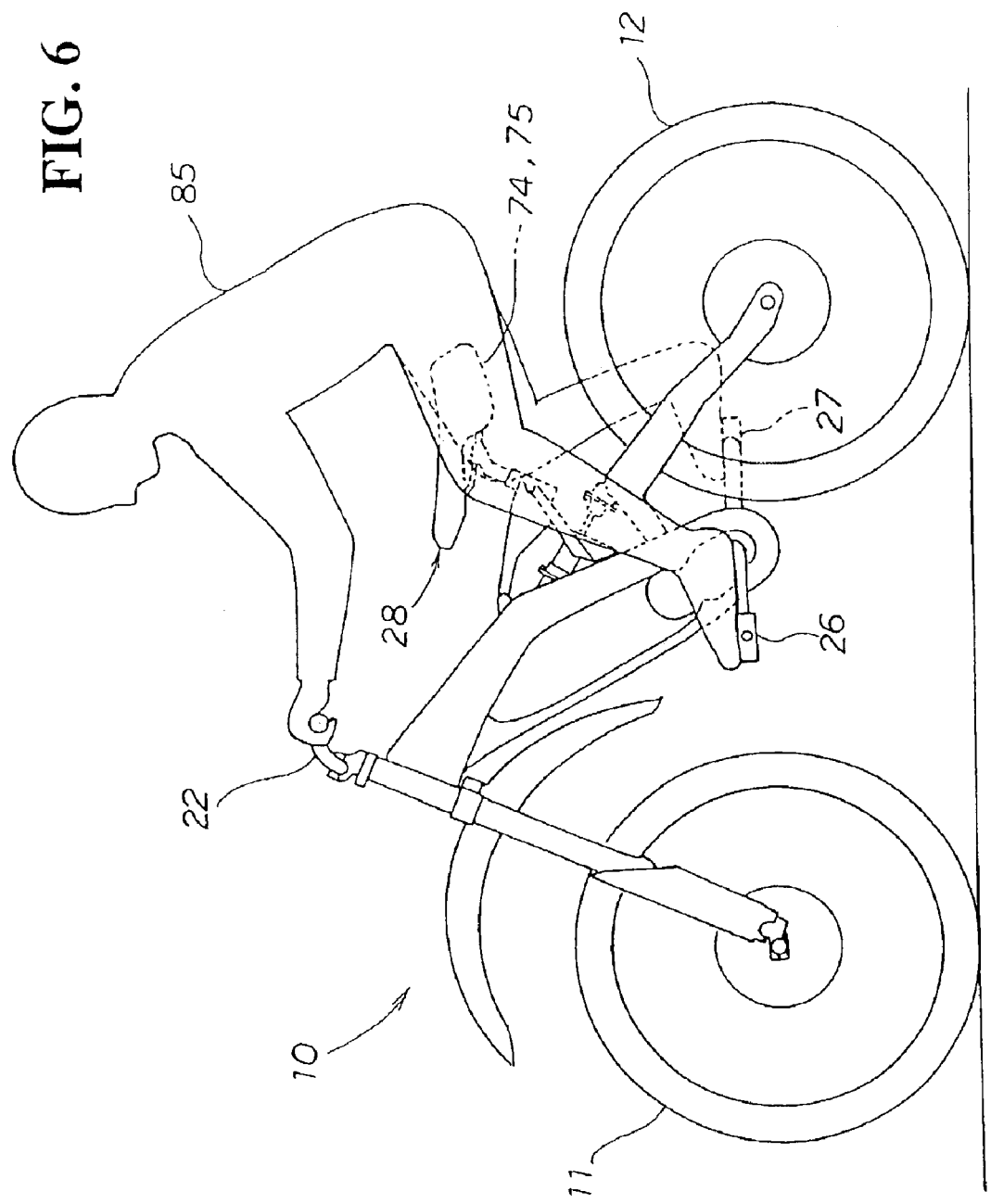
FIG. 6 is a side view illustrating operation of the saddle according to the first embodiment of the present invention.
Figure 7:
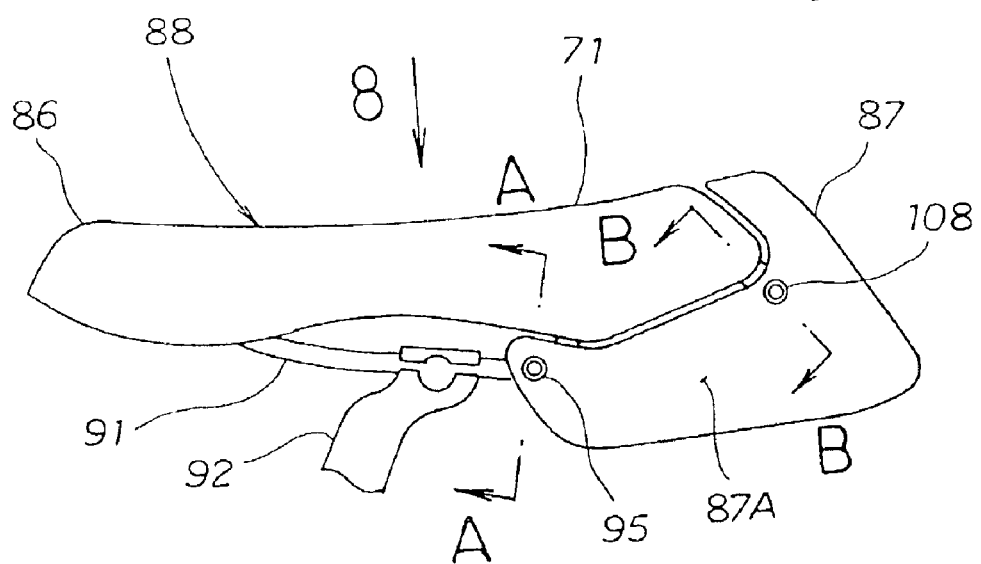
FIG. 7 is a side view of a saddle according to a second embodiment of the present invention.
Figure 8:
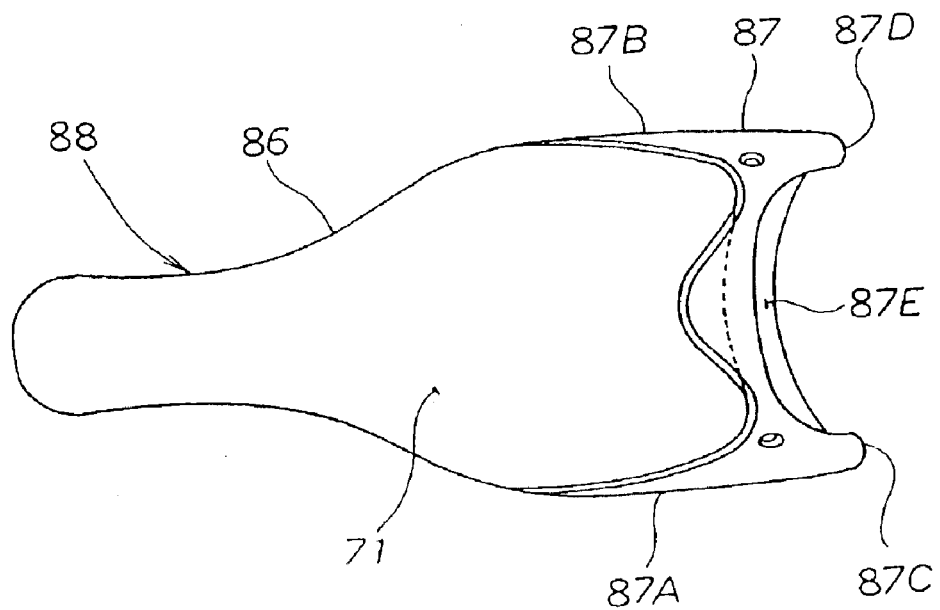
FIG. 8 is a plan view taken along the direction indicated by an arrow mark 8 in FIG. 7.
Figure 9B:
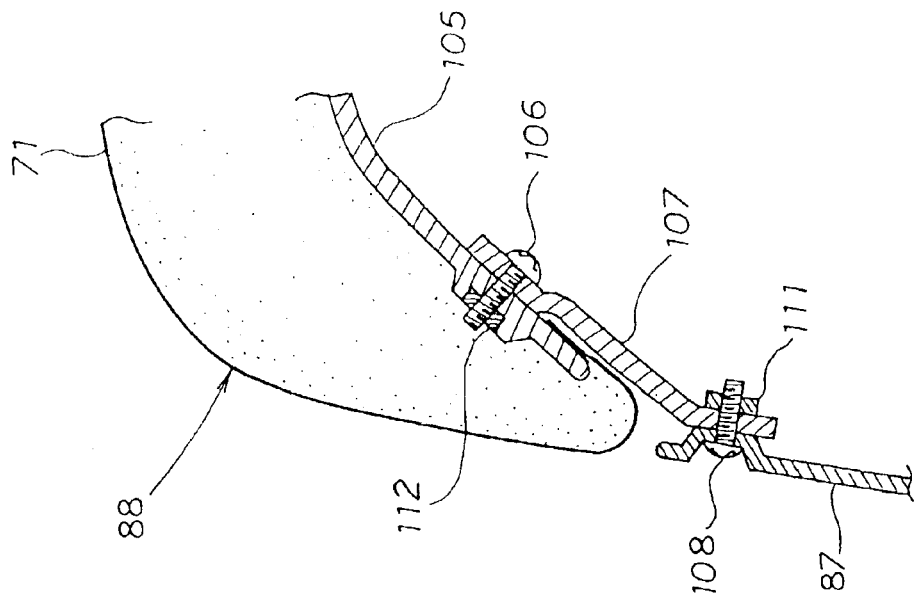
FIGS. 9(a)–(b) are side views of the saddle according to the second embodiment of the present invention.
Figure 9A:
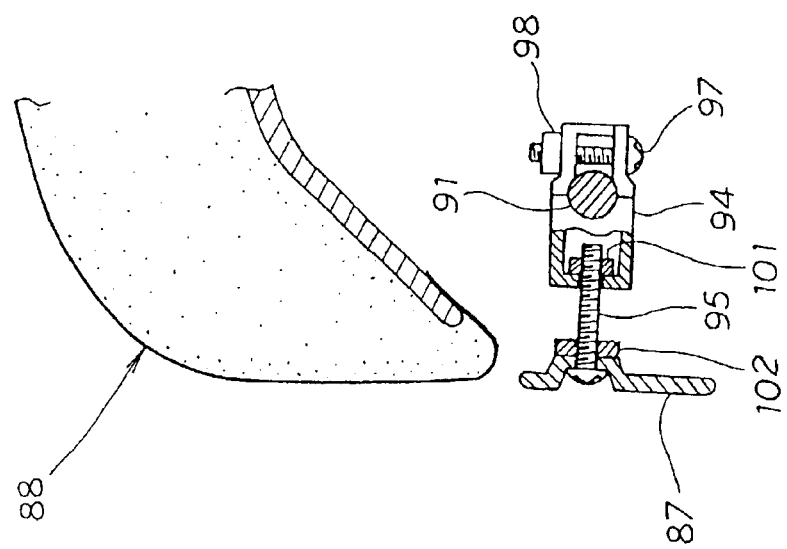

FIG. 1 is a perspective view of a bicycle including a saddle according to a first embodiment of the present invention. FIG. 2 is a side view of the bicycle including the saddle according to the first embodiment of the present invention. FIG. 3 is a side view of the saddle according to the first embodiment of the present invention. FIG. 4 is a plan view taken along the direction indicated by an arrow mark 4 in FIG. 3. FIG. 5 is a sectional view taken along line 5—5 of FIG. 3. FIG. 6 is a side view illustrating operation of the saddle according to the first embodiment of the present invention. FIG. 7 is a side view of a saddle according to a second embodiment of the present invention. FIG. 8 is a plan view taken along the direction indicated by an arrow mark 8 in FIG. 7. FIGS. 9(a)–(b) are side views of the saddle according to the second embodiment of the present invention. FIG. 10 is a side view of a saddle according to a third embodiment of the present invention.

FIG. 1 is a perspective view of a bicycle including a saddle according to a first embodiment of the present invention. The exemplary bicycle 10 is a vehicle for a downhill race. In order to use the bicycle 10 in a race wherein bicycles ride down along a unpaved, timed course in which high speed corners and jump sections are provided along a woodland path, a skiing slope, or the like, an impact from the road surface upon a front wheel 11 and a rear wheel 12 is absorbed by a front fork 14 and a rear cushion unit 15 (shock absorber) respectively. In addition, the rigidity of a body frame 16 is raised to support a high load while flexibility is provided to a portion of the body frame 16 to improve steering performance. A disk brake (hereinafter described in detail) is adopted in order to increase the braking force of the front wheel 11 and the rear wheel 12.

FIG. 2 is a side view of the bicycle including the saddle according to the first embodiment of the present invention. The bicycle 10 is a vehicle wherein the front fork 14 described above is mounted for steering movement on a head pipe 21. The front wheel 11 is mounted for rotation at a lower end of the front fork 14 and a handle bar 22 is attached to an upper portion of the front fork 14. The body frame 16 extends obliquely rearward and downward from the head pipe 21 and an L-shaped swing arm 23 is mounted for upward and downward swinging motion at a rear portion of the body frame 16. The rear wheel 12 is mounted for rotation at a rear end of the swing arm 23. The rear cushion unit 15 extends between the body frame 16 and the swing arm 23. A speed change gear 25 is mounted at a rear portion of the body frame 16 and a pair of pedals 26 and 27 are mounted on the left and right of the speed change gear 25. A saddle 28 is mounted at an intermediate portion of the body frame 16.

Here, a front wheel disk brake 31, having a brake caliper 32 and a brake disk 33, front fork protectors 34, 34 for protecting a lower portion of the front fork 14, a front fender 35, a reservoir tank 36 connected to the rear cushion unit 15 by a hose 37 and a driving side sprocket wheel 38 mounted on an output power shaft of the speed change gear 25 are provided as shown. A driven sprocket wheel 41 mounted on the rear wheel 12, a chain 42 extending between and around the driving side sprocket wheel 38 and the driven side sprocket wheel 41, and a rear wheel disk brake 43, including a brake caliper 44 and a brake disk 45 are also provided.

The body frame 16 includes a box frame portion 51 having a box-like shape extending obliquely rearward and downward from the head pipe 21, a twin tube portion 52 extending obliquely rearward and downward separately on the left and right from a rear end of the box frame portion 51, e.g., along an extension line of the box frame portion 51, a rear frame portion 53 extending obliquely rearward and downward from rear ends of the twin tube portion 52 at an inclination angle greater than the inclination angle of the box frame portion 51 and the twin tube portion 52, a down tube 54 extending obliquely rearward and downward from a lower portion of a front end of the box frame portion 51 and connected to rear ends of the rear frame portion 53, and a saddle frame 56 (refer to FIG. 2) provided for mounting the saddle 28 (refer to FIG. 2) on the rear end of the twin tube portion 52 and an intermediate portion of the rear frame portion 53.

The box frame portion 51 has a box-like shape so that high rigidity is provided to a front portion of the body frame 16. The twin tube portion 52 is divided into left and right tubes 52L and 52R (refer to FIG. 1) to reduce the rigidity so that a central portion of the body frame 16 may be twisted readily. The twin tube portion 52 includes a cushion mounting portion (not shown) for mounting a front end of the rear cushion unit 15 (refer to FIG. 2) on an inner face of the rear end thereof. Further, the twin tube portion 52 includes a pair of saddle frame front mounting portions 52B, 52B (the saddle frame front mounting portion 52B on the interior side is not shown; refer to also FIG. 1) for mounting a front portion of the saddle frame 56 at an upper portion of a rear end thereof.

The rear frame portion 53 has an increased width in the leftward and rightward direction to facilitate accommodation of the speed change gear 25 therein and to increase the supporting force for supporting the twist acting upon the mounting portion of the swing arm 23. The mounting portion includes a pair of left and right frame portions 53L and 53R (the frame portion 53R on the interior side is not shown), and has an arm mounting portion (not shown) at an inner face of an intermediate portion thereof for mounting the front end of the swing arm 23. The rear frame portion 53 further has a pair of saddle frame rear mounting portions 53C, 53C (the saddle frame rear mounting portion 53C on the interior side is not shown) at an upper intermediate portion thereof for mounting a rear portion of the saddle frame 56.

The down tube 54 has a bifurcated portion 54A formed in a bifurcated shape at a rear portion thereof for supporting the speed change gear 25 and connecting the speed change gear 25 to the rear end of the rear frame portion 53, and a pair of speed change gear mounting holes 54B, 54B (the speed change gear mounting hole 54B on the interior side is not shown) perforated at a root portion of the bifurcated portion 54A for mounting the speed change gear 25. It is to be noted reference characters 54C, 54C (the reference character 54C on the interior side is not shown) denote left and right curved arm portions, which form the bifurcated portion 54A.

As described above, the box frame portion 51 is provided in the proximity of the head pipe 21, and the twin tube portion 52 of a low rigidity (compared to the box frame portion 51) is provided rearwardly of the box frame portion 51. Therefore, a high load applied to the body frame 16 from the front wheel 11 through the front fork 14 is received by the box frame portion 51. A twist is generated on the body frame 16 rearward of the twin tube portion 52 to prevent sudden transmission of the high load mentioned above to achieve both augmentation of the rigidity of the body frame 16 and improvement of the steering performance of the vehicle.

The swing arm 23 is a substantially L-shaped member including an upright portion 62 extending obliquely rearward and upward from a pivot shaft 61 mounted on the rear frame portion 53 and a rear extension 63 extending obliquely rearward and downward from an upper end of the upright portion 62. A mounting shaft 64 at a rear end of the rear cushion unit 15 is attached to a connecting portion between the upright portion 62 and the rear extension 63. It is to be noted that reference numeral 65 denotes a mounting shaft provided on the twin tube portion 52 for mounting a front end of the rear cushion unit 15, and 67 an axle of the rear wheel 12.

FIG. 3 is a side view of the saddle according to the first embodiment of the present invention. FIG. 3 shows that the opposite side faces 72 and 73 (the side face 73 on the interior side is not shown) of a seat face 71 of the saddle 28 are swollen rearward and downwardly, e.g., the side faces 72 and 73 expand in size rearward and downwardly to form a pair of left and right knee grip portions 74 and 75 (the knee grip portion 75 on the interior side is not shown). The knee grip portion 74 is a portion indicated by cross hatching lines. This similarly applies to the following figures. The knee grip portions are held between the inner sides of the knees and the inner parts of the thighs of the driver. It is to be noted that reference characters 74A, 75A denote swollen side faces of the knee grip portions 74 and 75 respectively. Further, an alternate long and two short dashes line indicates the shape of a rear portion of a conventional saddle (this similarly applies to the following figures).

FIG. 4 is a plan view taken along the direction indicated by an arrow mark 4 in FIG. 3. The knee grip portions 74 and 75 are projected rearward from the opposite side faces 72 and 73 of the saddle 28 respectively. In particular, the knee grip portions 74 and 75 are projected rearward with respect to a central rear portion 77 of the saddle 28.

FIG. 5 is a sectional view taken along line 5—5 of FIG. 3. The knee grip portions 74 and 75 are projected downwardly from the opposite side portions of the saddle 28. In particular, side walls 81, 81 of a bottom plate 78 provided at a bottom portion of the saddle 28 are extended downwardly as compared with those of the prior art, and a cushion member 82 is disposed also at side portions of the side walls 81, 81 and covered with a skin member 83.

The operation of the saddle 28 described above is described in greater detail hereinafter. FIG. 6 is a side view illustrating operation of the saddle according to the first embodiment of the present invention. For example, during a race such as a downhill race, if the surface roughness of the road is high, then the bicycle body is rendered less stable. Therefore, a driver 85 can raise their hips from the saddle 28 and hold the knee grip portions 74 and 75 between the inner parts of the thighs thereof so as to support the bicycle 10 at the three points of the knee grip portions 74 and 75, the handle bar 22 and the pedals 26 and 27 to further stabilize the bicycle 10.

As described above with reference to FIGS. 3 to 5 and 6, the present invention is characterized in that the opposite side faces 72 and 73 of the seat face 71 on which the driver 85 is to be seated expand rearward and the expanded portion side faces 74A and 75A are further expanded downward to form the pair of left and right knee grip portions 74 and 75 such that the driver 85 holds the knee grip portions 74 and 75 between the inner sides of the knees and the inner parts of the thighs thereof.

During running of the bicycle 10, the driver 85 can support the bicycle 10 not only at the handle bar 22 and the pedals 26 and 27, but also at the knee grip portions 74 and 75, and can augment the stability of the bicycle 10 and the steering performance of the bicycle 10. Further, since the driver 85 holds the knee grip portions 74 and 75 during operation of the bicycle 10, the driver 85 can maintain a good posture. In addition, the cornering speed can be raised. Further, if the area of the expanded side faces 74A and 75A of the knee grip portions 74 and 75 are increased, then the knee grip portions 74 and 75 can be held readily between the inner sides of the knees and the inner parts of the thighs. Therefore, the operability of the bicycle can be improved.

A second characteristic of the present invention is that the knee grip portions 74 and 75 are formed integrally with the seat face 71. Accordingly, the number of parts of the saddle 28 and the cost of the saddle 28 can be reduced. Further, the saddle 28 on which the knee grip portions 74 and 75 are integrally formed, e.g., in a single piece, can be readily manufactured.

FIG. 7 is a side view of a saddle according to a second embodiment of the present invention. The saddle 88 wherein a knee grip portion 87 made of a resin material or a light alloy material is mounted at a rear portion and a lower portion of a saddle body 86. The form of the saddle 88 corresponds to a conventional saddle to which the knee grip portion 87 is added. It is to be noted that reference numeral 91 denotes a saddle frame that supports a bottom plate (not shown) provided on a bottom portion of the saddle body 86 and to which a saddle post 92 supported on the saddle frame 56 (refer to FIG. 2) is attached.

The knee grip portion 87 includes a pair of left and right expanded side faces 87A and 87B (the swollen side face 87B on the interior side is not shown) expanding rearward of the saddle body 86 and also expanding downward. FIG. 8 is a plan view taken along the direction indicated by an arrow mark 8 in FIG. 7 and shows that the knee grip portion 87 is disposed such that it extends from the opposite side portions of a rear portion to the rear portion of the saddle body 86.

The opposite side portions of the knee grip portion 87 project rearwardly to form rear projecting portions 87C and 87D. It is to be noted that, while the knee grip portion 87 is recessed at the rear central portion 87E, the rear central portion 87E may otherwise recede up to the rear projecting portions 87C and 87D so that the rear portion of the knee grip portion 87 may have a flattened face.

FIGS. 9(a)–(b) are side views of the saddle according to the second embodiment of the present invention. FIG. 9(a) is a sectional view taken along line A—A of FIG. 7. A fixing bracket 94 is mounted on a saddle frame 91 of the saddle 88, and the knee grip portion 87 is secured to the fixing bracket 94 by means of a screw 95. It is to be noted that reference numerals 97, 98 denote a screw and a nut for mounting the fixing bracket 94 on the saddle frame 91 respectively. Reference numeral 101 denotes a nut for connecting the screw 95 to the fixing bracket 94, and numeral 102 denotes a lock nut for stopping turning of the screw 95.

FIG. 9(b) is a sectional view taken along line B—B of FIG. 7. A stay 107 serving as a supporting member is mounted on a bottom plate 105 of the saddle 88 by means of a screw 106, and the knee grip portion 87 is mounted on the stay 107 by means of a screw 108 and a nut 111. It is to be noted that reference numeral 112 denotes a nut provided integrally on the bottom plate 105 for threaded coupling to the screw 106.

As described above with reference to FIG. 7, the present invention is may include knee grip portions 87 formed separately from the saddle body 86 on which the seat face 71 is provided. The knee grip portion 87 can be removed from the saddle body 86 when necessary, and the usability of the saddle 88 can be augmented. Further, the knee grip portion 87 can be mounted readily on an existing saddle, which includes only a seat face.

FIG. 10 is a side view of a saddle according to a third embodiment of the present invention. The saddle 115 wherein a knee grip portion 114 made of a resin material or a light alloy material is mounted at a rear portion and a lower portion of a saddle body 86. The form of the saddle 115 corresponds to a conventional saddle to which the knee grip portion 114 is added.

The knee grip portion 114 of the saddle 115 is a panel member on which a rear extension 117 extending rearward of the vehicle body and a pair of left and right lower extensions 118, 118 (the lower extension 118 on the interior side is not shown) extending downward from the each opposite side of a front portion of the rear extension 117. The rear extension 117 is extended rearward farther than a vertical line 120, which passes the center of the axle 67 (refer to FIG. 2) of the rear wheel 12, such that it covers over the rear wheel 12 and serves as a mudguard for the rear wheel 12, e.g., as a rear fender.

As described above, the present invention may include a fourth characteristic in that the panel member on which the rear extension 117 extends rearward of the bicycle body, and the pair of left and right lower projecting portions 118, 118 extending downward from the each opposite side of the front portion of the rear extension 117 are formed is mounted at the rear portion of the seat face 71 such that the panel member serves both as a rear fender for covering over the rear wheel 12 at the rear extension 117 and a knee grip to be held between the inner sides of the knees and the inner parts of the thighs of the driver. In addition to the stabilization of the bicycle body by the knee grip portion 114, splashing of mud, dirt and debris by the rear wheel 12 can be prevented.

Figure 11:
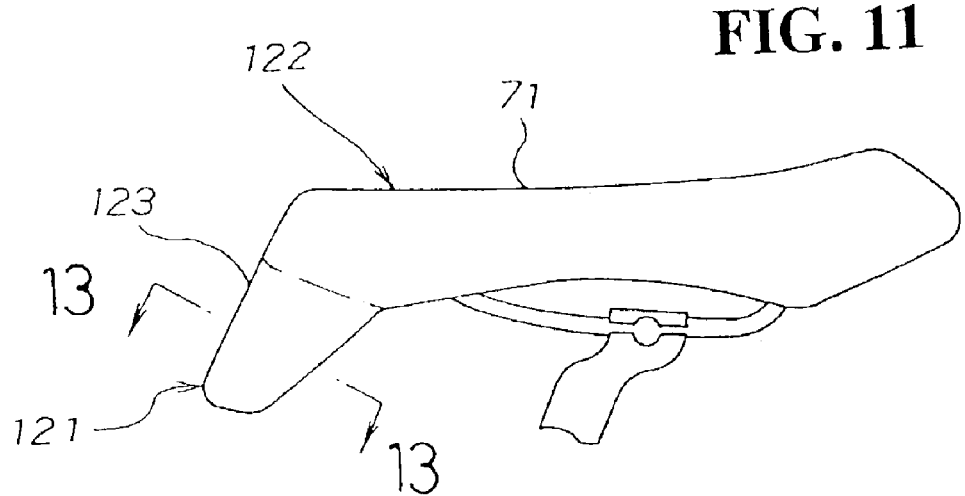
FIG. 11 is a side view of a saddle according to a fourth embodiment of the present invention.
Figure 12:
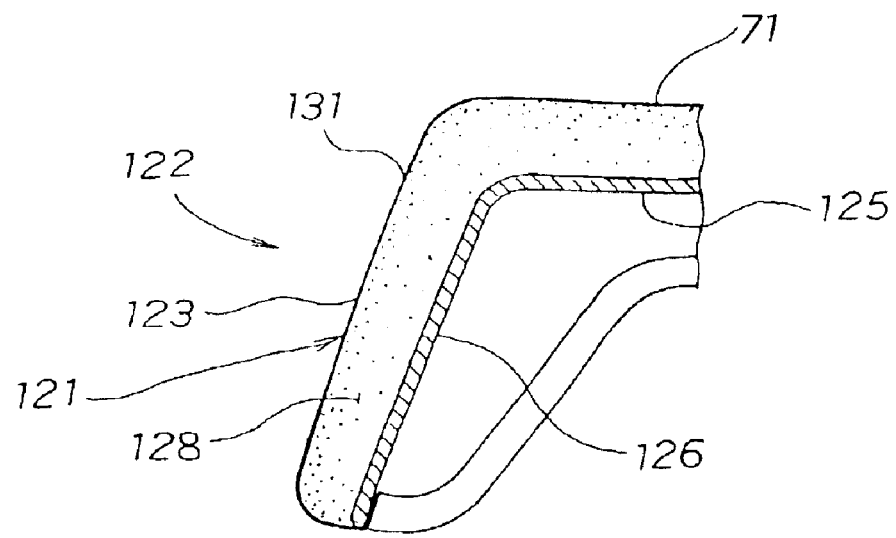
FIG. 12 is a sectional view of an extension portion of the saddle according to the fourth embodiment of the present invention.
Figure 13:
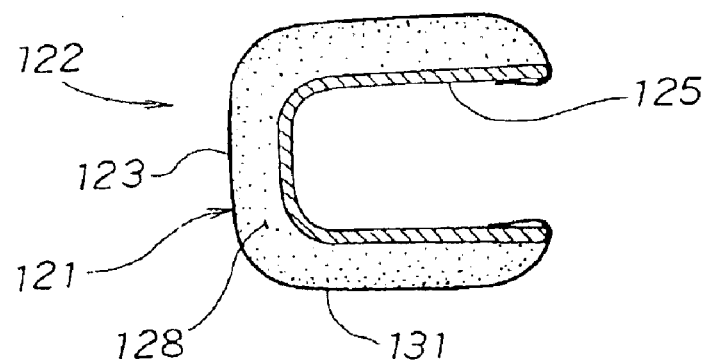
FIG. 13 is a sectional view taken along line 13—13 of FIG. 11.
Figure 14:
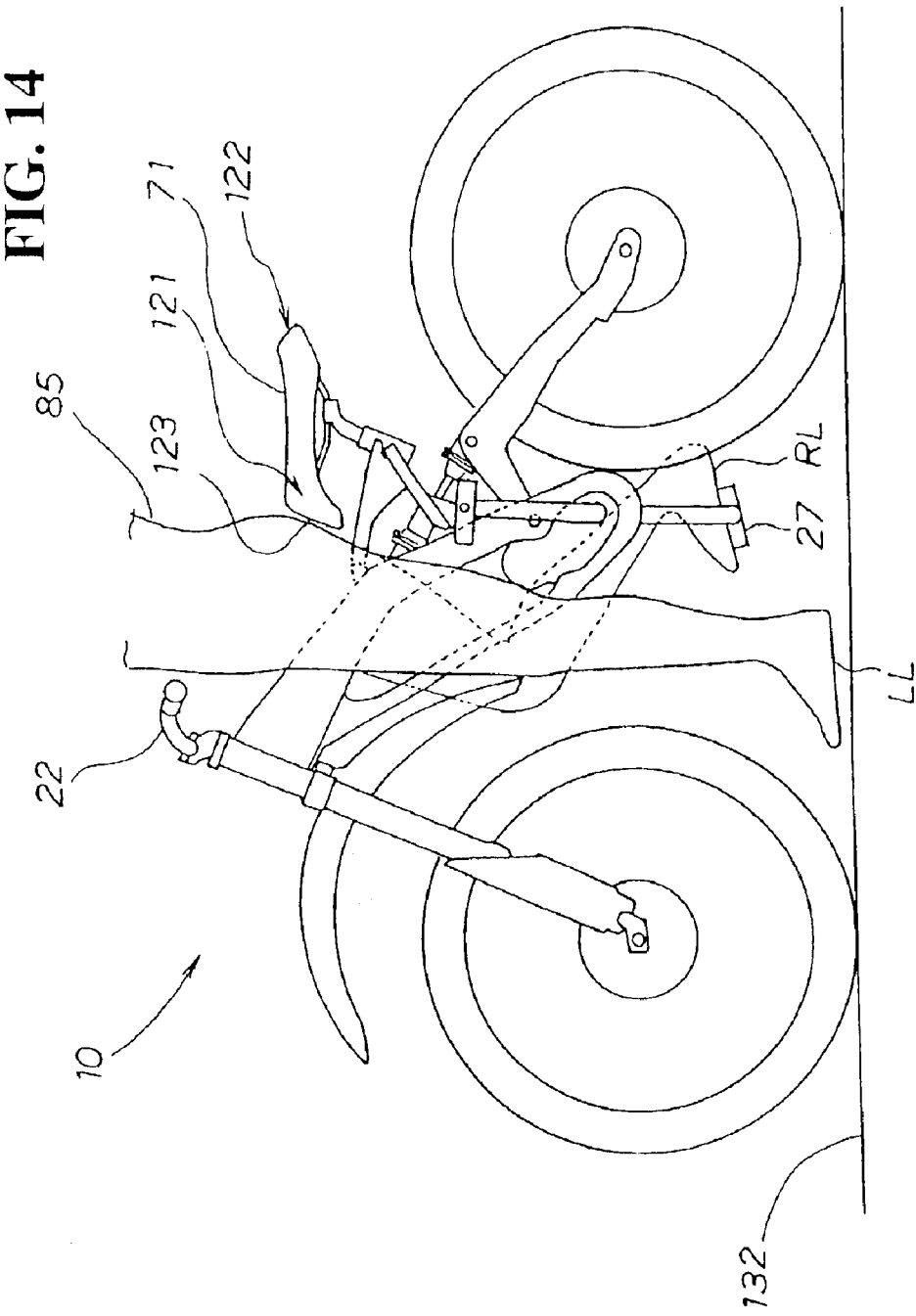
FIG. 14 is a view illustrating operation of the saddle according to fourth embodiment of the present invention.
Figure 17:
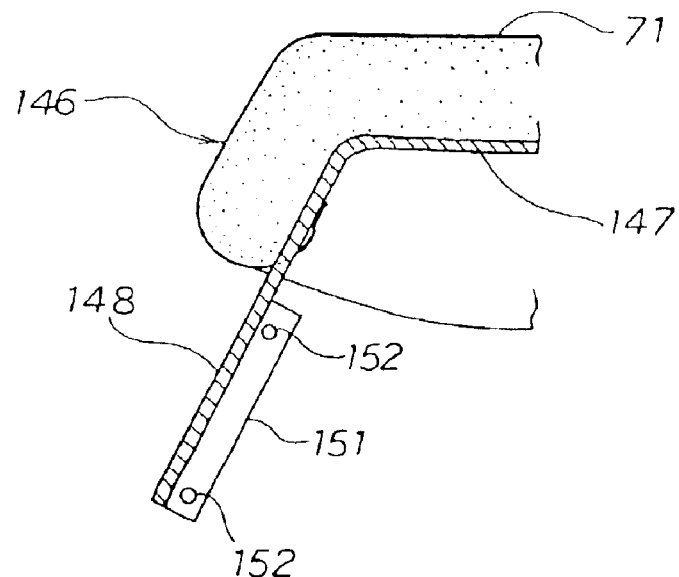
FIG. 17 is sectional view of a saddle according to a sixth embodiment of the present invention.

FIG. 11 is a side view of a saddle according to a fourth embodiment of the present invention. FIG. 12 is a sectional view of an extension portion of the saddle according to the fourth embodiment of the present invention. FIG. 13 is a sectional view taken along line 13—13 of FIG. 11. FIG. 14 is a view illustrating operation of the saddle according to fourth embodiment of the present invention. FIG. 15 is a side view of a saddle according to a fifth embodiment of the present invention. FIGS. 16(a)–(b) are sectional views of a front portion of the saddle according to the fifth embodiment of the present invention. FIG. 17 is sectional view of a saddle according to a sixth embodiment of the present invention.

FIG. 11 is a side view of a saddle according to the fourth embodiment of the present invention. The saddle 122 on which an extension 121 extends downward or obliquely forward and downward from a front end of the seat face 71 is integrally provided integrally. When the driver assumes a posture of moving his/her hips forward of the seat face 71 of the bicycle body, the driver's hips or waist can be received by a front face 123 of the extension 121.

FIG. 12 is a sectional view of the extension of the saddle according to the fourth embodiment of the present invention. A front portion of a bottom plate 125 of the saddle 122 is bent to form a bottom plate bent portion 126. A cushion member 128 extends along the front side of the bottom plate bent portion 126 from the seat face 71 side and is covered with a skin member 131 similarly to the seat face 71. Accordingly, when the driver's hips or waist is pressed against the front face 123 of the extension 121, it can be received with a greater surface area in addition to the interposing cushion member 128. Therefore, the contact pressure acting upon the hip or waist can be reduced.

FIG. 13 is a sectional view taken along line 13—13 of FIG. 11. The bottom plate 125 of the saddle 122 is formed so as to have a horseshoe-shaped cross section, and the cushion member 128 is applied to the outer side of the bottom plate 125. The surface of the cushion member 128 is covered with the skin member 131.

Operation of the saddle 122 described above is described in greater detail hereinafter. FIG. 14 is a view illustrating operation of the saddle according to the fourth embodiment of the present invention. For example, when the bicycle runs at a high speed along a slippery corner having a rough road surface during a downhill race, in order to maintain the stability of the bicycle body or prevent the driver from falling off the bicycle, the driver 85 assumes a posture of displacing his/her hip to a forward direction of the bicycle body from the seat face 71. The hip is lowered farther than the position of the seat face 71 to place the center of gravity to a lower position. The foot RL (for example, the foot on the opposite side to the direction of cornering) is placed on the pedal 27 while the other foot LL is extended to a position near to the ground surface 132. The driver 85 presses or positions the hip or waist thereof against or in the proximity of the front face 123 of the extension 121.

During cornering, the driver 85 can consequently place the center of gravity to a lower position and support the bicycle 10 at the extension 121 of the saddle 122 in addition to the handle bar 22 and one of the pedals 27 thereby to further stabilize the bicycle body. The posture of the driver 85 itself can also be maintained. Further, if the bicycle 10 becomes inclined to fall, then the driver 85 can immediately put a foot on the ground to prevent the bicycle 10 from falling.

The present invention may include a fifth characteristic in that the extension 121 which extends downwardly or obliquely forwardly downwards from the front end of the seat face 71 is provided such that, when the driver assumes a posture of moving his/her hip to a forward direction of the bicycle body from the seat face 71, the hip or waist is received by the front face 123 of the extension 121. When the driver assumes a posture of moving his/her hip to a forward direction of the bicycle body from the seat face 71, the front face 123 of the extension 121 receives the hip or waist. Accordingly, the hip or waist can be contacted in a face-to-face contacting relationship with the front face 123 of the extension 121, and a high pressure can be prevented from acting upon the hip or waist.

The present invention may include a sixth characteristic in that the extension 121 is formed integrally with the seat face 71 as described hereinabove with reference to FIGS. 11 to 13. The number of parts of the saddle 122 can be reduced, and the cost of the saddle 122 can be lowered. Further, the saddle 122 on which the extension 121 is integrally formed integrally can be readily manufactured.

FIG. 15 is a side view of a saddle according to the fifth embodiment of the present invention. FIG. 15 shows the saddle 136 wherein an extension 135 is mounted at a lower front portion of a saddle body 134 such that the driver's hip or waist can be received by the extension 135. FIGS. 16(*a*) and 16(*b*) are sectional views of a front portion of the saddle according to the fifth embodiment of the present invention.

FIG. 16(*a*) shows that a stay 141 is mounted on a bottom plate 137 of the saddle 136 by means of a bolt 138, and an extension 135 (refer to FIG. 15) is mounted on the stay 141. It is to be noted that reference numerals 143 denote mounting holes provided in the stay 141 for mounting the extension 135, and numerals 144 denote nuts mounted on the bottom plate 137 for threaded-coupling to the bolt 138. FIG. 16(*b*) is a sectional view taken along line 16—16 of FIG. 15. The extension 135 is mounted on the stay 141 by means of a screw 145, 145.

FIG. 17 is a sectional view showing a saddle according to a sixth embodiment of the present invention. FIG. 17 shows that a bent portion 148 is formed by bending a front portion of a bottom plate 147 of the saddle 146 obliquely downward and forward, and an extension 135 (refer to FIG. 15) is mounted on the bent portion 148. It is to be noted that reference numerals 151, 151 (the reference numeral 151 on the interior side is not shown) denote locating faces formed by bending the bent portion 148 from the left and the right, and 152, 152 denote mounting holes perforated in the locating faces 151, 151 for mounting the extension 135.

As described above with reference to FIG. 15 and FIGS. 16(*a*) and 16(*b*), the present invention may include a seventh characteristic in that the extension 135 is formed as a member separate from the saddle body 134, e.g., is attached through the stay 141 as a supporting member to the saddle body 134 on which the seat face 71 is provided. The extension 135 can be removed from the saddle body 134 if necessary, and the saddle body 134 itself can be used and operability can be improved.

The present invention may include an eighth characteristic in that the supporting member is the stay 141 secured to the bottom plate 137 of the saddle 136. If the shape of the stay 141 is changed, then the position of the extension 135 can be changed, and the extension 135 can be disposed in accordance with the driver's preference. The present invention may also include a ninth characteristic feature in that the supporting member is formed by extending the bottom plate 147 provided at the bottom portion of the saddle 146. Consequently, the number of parts of the saddle 146 and the cost of the saddle 146 can be reduced.

Figure 18:
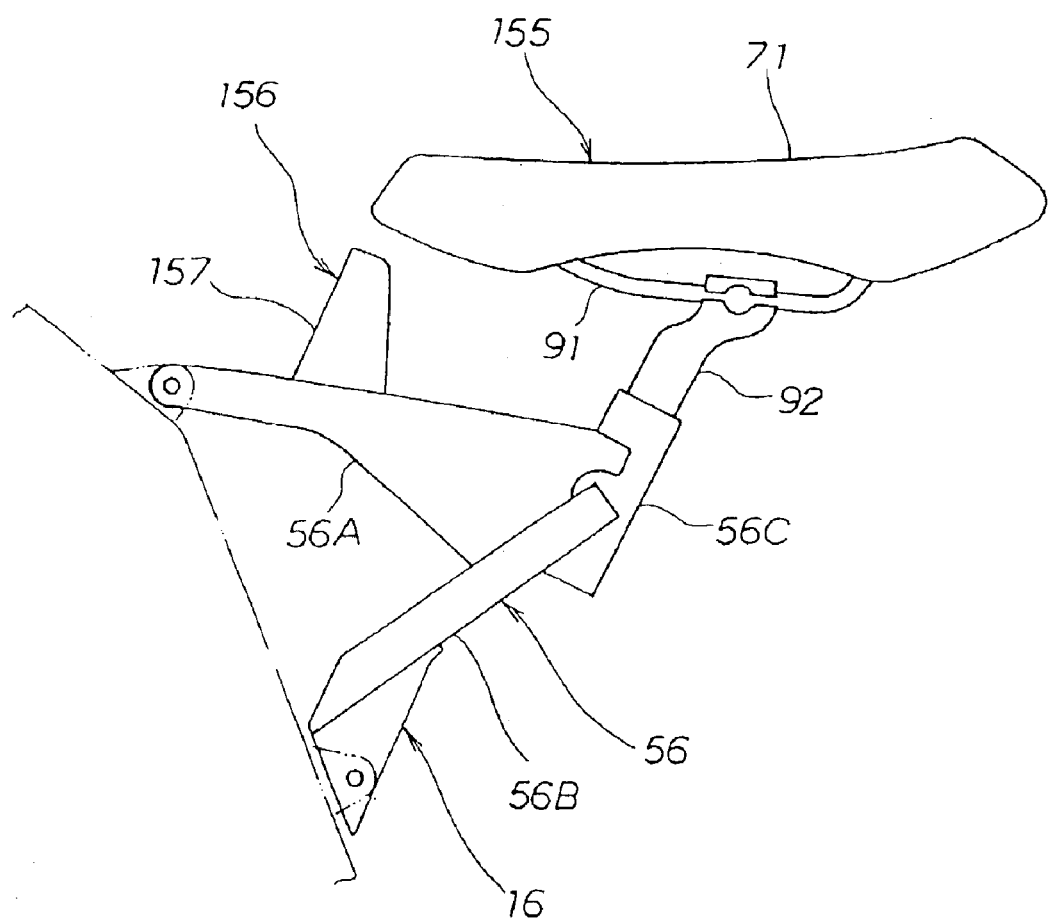
FIG. 18 is a side view of a driver supporting structure for a bicycle according to a seventh embodiment of the present invention.
Figure 19:
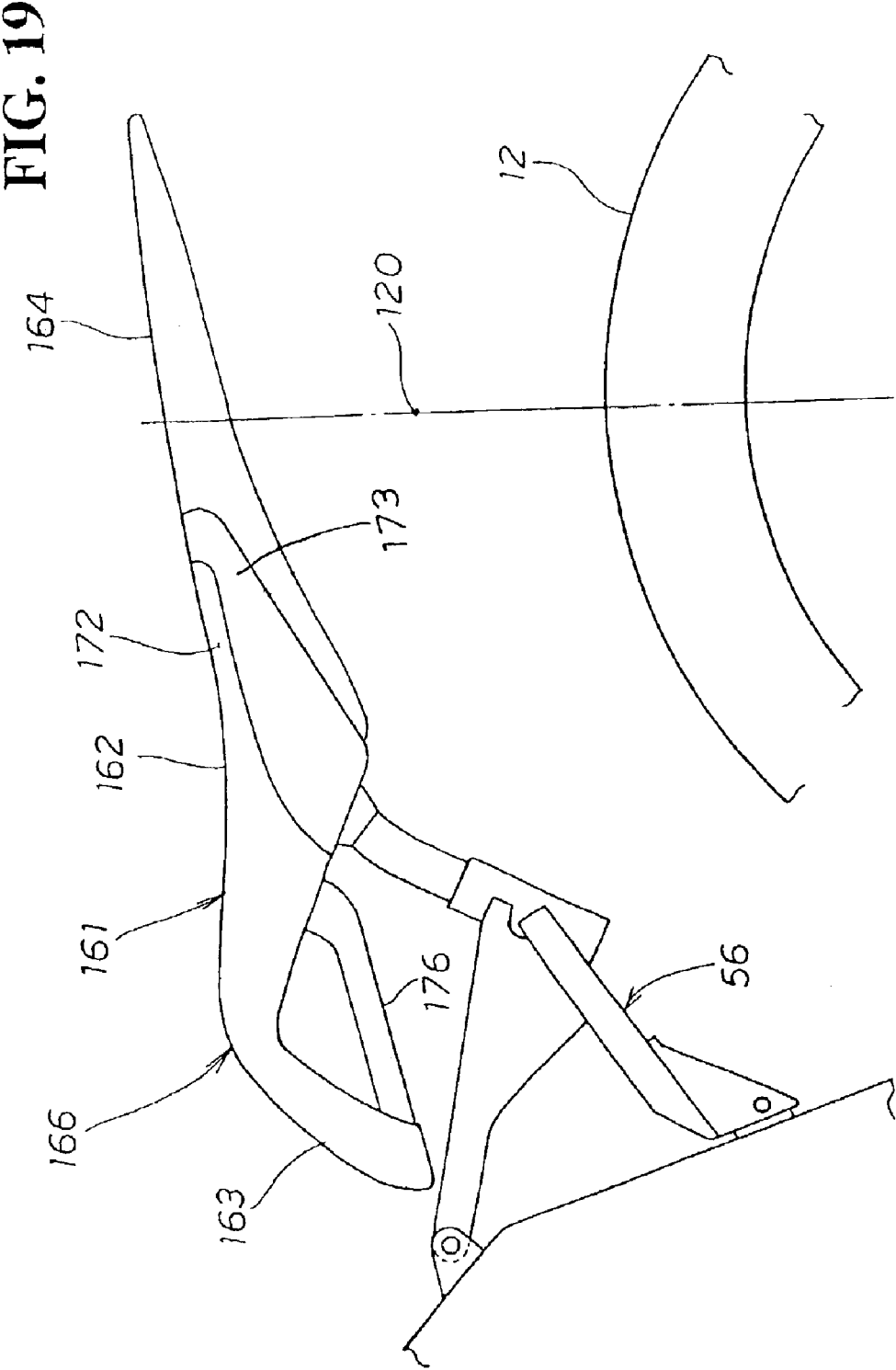
FIG. 19 is a side view of a saddle according to an eighth embodiment of the present invention.
Figure 20:
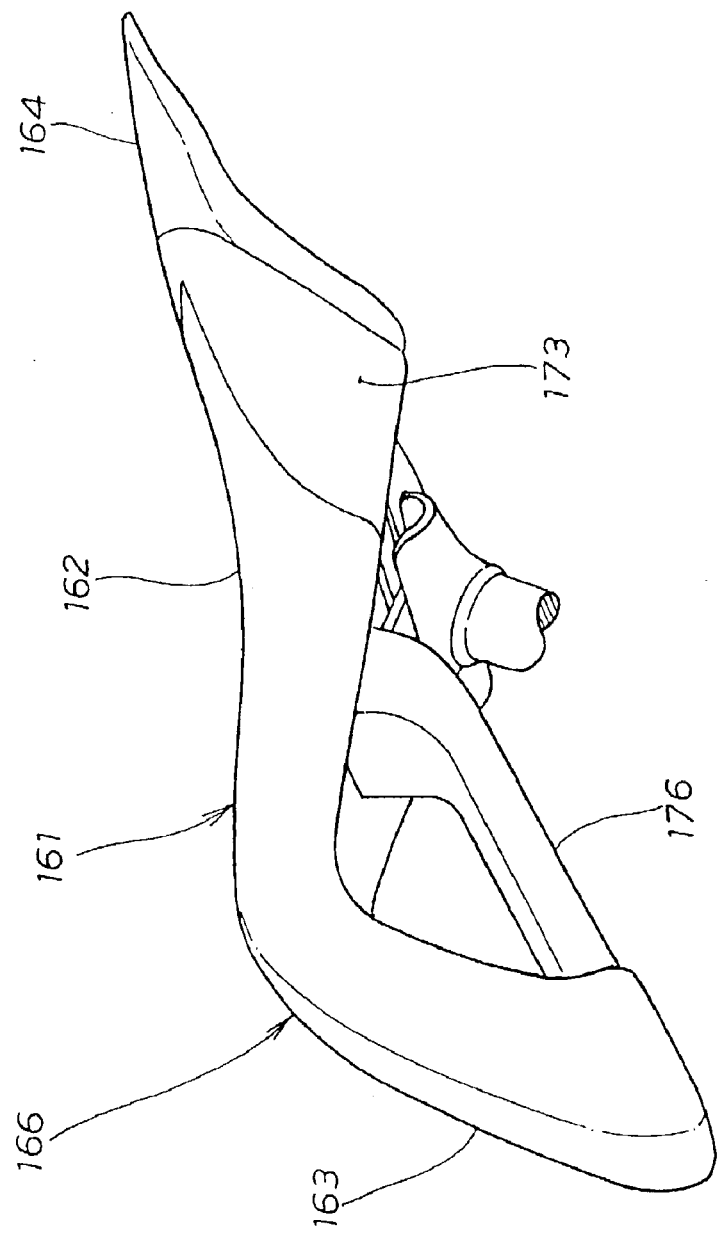
FIG. 20 is a perspective view of the saddle according to the eighth embodiment of the present invention.
Figure 21:
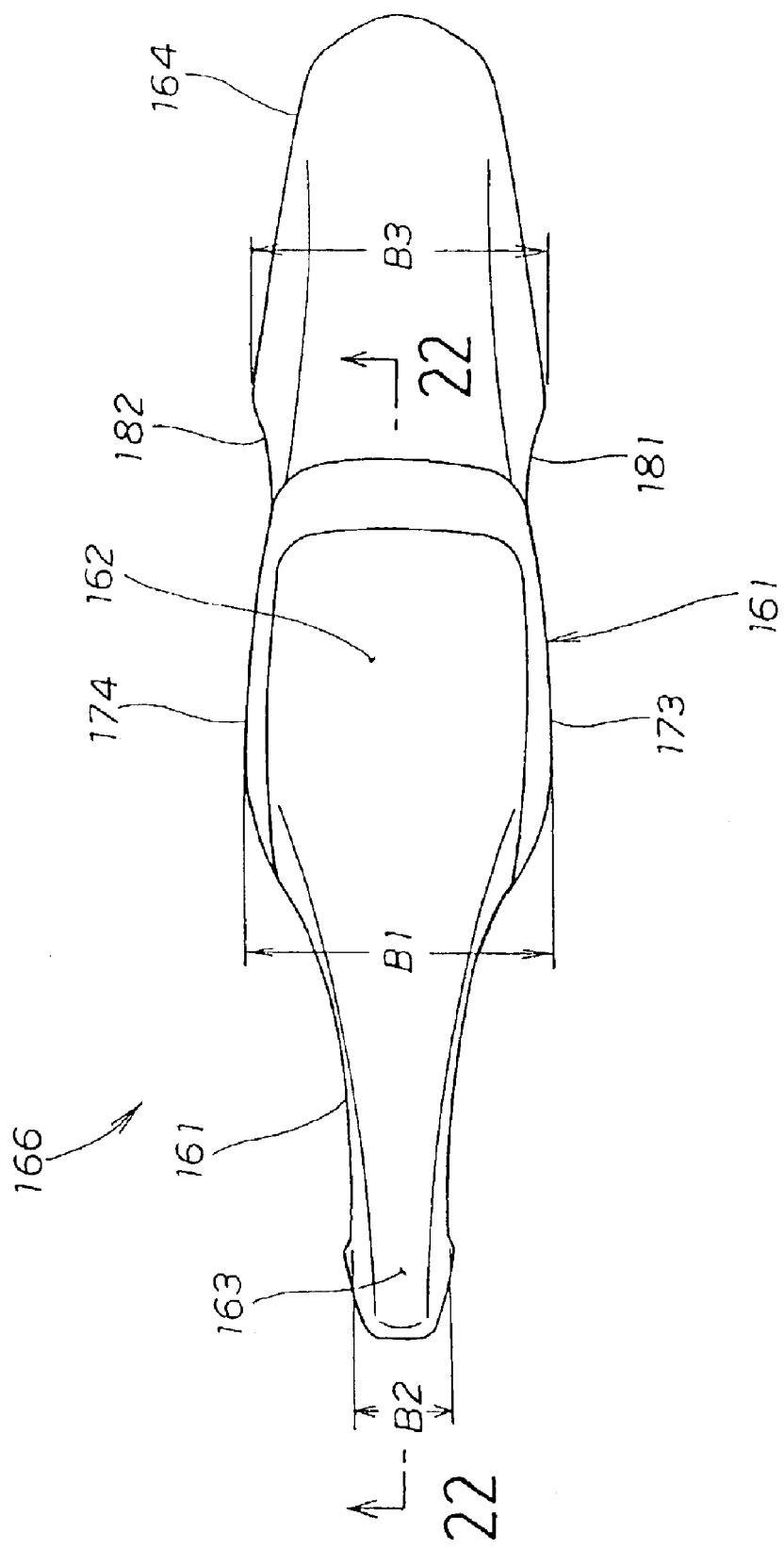
FIG. 21 is a plan view of the saddle according to the eighth embodiment of the present invention.
Figure 22:
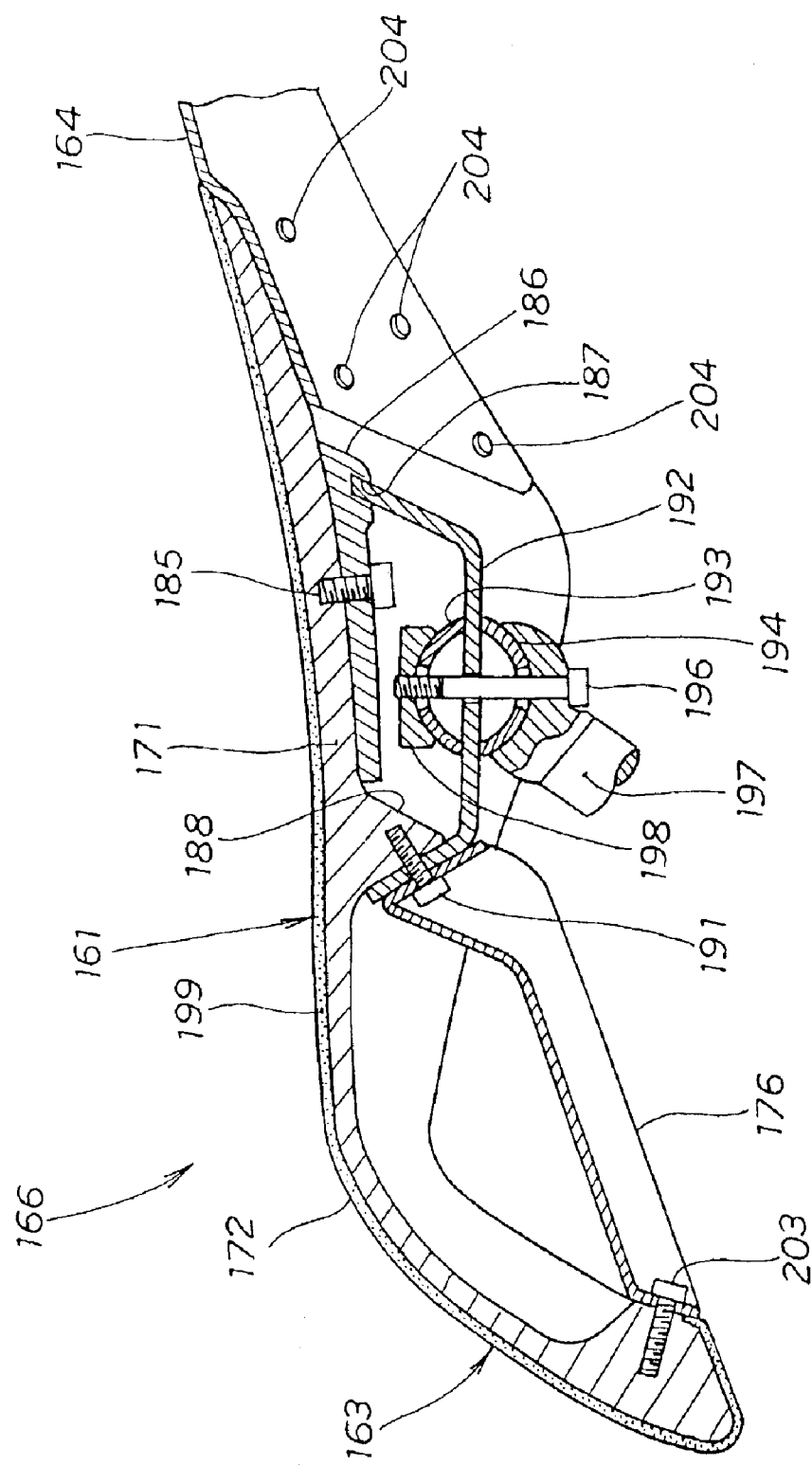
FIG. 22 is a sectional view taken along line 22—22 of FIG. 21.

FIG. 18 is a side view of a driver supporting structure for a bicycle according to a seventh embodiment of the present invention. FIG. 19 is a side view of a saddle according to an eighth embodiment of the present invention. FIG. 20 is a perspective view of the saddle according to the eighth embodiment of the present invention. FIG. 21 is a plan view of the saddle according to the eighth embodiment of the present invention. FIG. 22 is a sectional view taken along line 22—22 of FIG. 21.

FIG. 18 is a side view showing a driver supporting structure for a bicycle according to the seventh embodiment of the present invention. An extending piece 156 extending upward or obliquely rearward and upward is mounted on a saddle frame 56, which is forward and downward of a front end of a saddle 155.

The saddle frame 56 includes an upper frame portion 56A provided at an upper portion, a lower frame portion 56B provided under the upper frame portion 56A, and a cylindrical portion 56C connected to end portions of the upper frame portion 56A and the lower frame portion 56B. The extending piece 156 mentioned above is mounted on the upper frame portion 56A. The driver's hip or waist is received by a front face 157 of the extending piece 156 to stabilize the bicycle body when the driver assumes a posture of moving his/her hips to a position forward of the seat face 71 of the bicycle body.

According to a tenth characteristic of the present invention, the present invention may include the extending piece 156 extending upward or obliquely rearward and upward on the body frame 16, which is forward and downward of the front end of the saddle 155, particularly on the saddle frame 56, such that, when the driver assumes a posture of moving his/her hip to a position forward of the seat face of the bicycle body, the driver's hips or waist is received by the front face 157 of the extending piece 156.

Since the extending piece 156 is provided on the body frame 16, when the driver assumes a position forward of the saddle 155, the driver's hip or waist is received by the front face 157 of the extending piece 156 such that the hip or waist can be contacted in a face-to-face contacting relationship with the front face of the extending piece 156. Consequently, a high pressure can be prevented from acting upon the hip or waist. Further, since the extending piece 156 is supported by the body frame 16, the rigidity of the extending piece 156 can be increased.

FIG. 19 is a side view of a saddle according to the eighth embodiment of the present invention. FIG. 19 shows the saddle 166 wherein an extension 163 extending obliquely forward and rearward from a front end of a seat face 162 of a saddle body 161 is integrally provided, and a rear fender 164 made of a resin material or a light alloy material for covering over a rear wheel 12 is mounted at a rear portion of the saddle body 161. The saddle body 161 is configured such that the outer surface of the saddle body 161 is covered with a skin member 172 and the side faces of a rear portion of the saddle body 161 are formed as knee grip portions 173 and 174 (the knee grip portion 174 on the interior side is not shown). A support member 176 made of a resin material for supporting the extension 163 is mounted on the inner side of a lower end portion of the extension 163. The rear fender 164 extends in the rearward direction farther than a vertical line 120, which passes the center of an axle 67 (refer to FIG. 2) of the rear wheel 12.

FIG. 20 is a perspective view of the saddle (eighth embodiment) according to the present invention. FIG. 20 shows the saddle 166 wherein the extension 163 extends obliquely forward and downward in a curved form from the seat face 162 side, the knee grip portions 173 and 174 (the knee grip portion 174 on the interior side is not shown) having a larger surface area are formed on the side faces of the lower portion of the seat face 162, and the rear fender 164 is mounted integrally in a continuing manner to the rear portion of the saddle body 161.

FIG. 21 is a plan view of the saddle according to the eighth embodiment of the present invention. The saddle 166 is configured such that the rear portion of the saddle body 161 is formed with an increased width to form the seat face 162 having an increased surface area, and the distance B1 between the knee grip portions 173 and 174 is increased to augment the comfort of the seat face 162 and the holding performance of the knee grip portions 173 and 174. In addition, the width B2 of the front portion of the saddle body 161 is reduced so that it does not make an obstacle to movement of the driver's legs when the driver raises the hip from the seat face 162.

Further, the saddle 166 is configured such that front curved portions 181 and 182 whose opposite side edge portions are expanded while being curved rearward are provided at front portions of the rear fender 164 so as to provide the front curved portions 181 and 182 also with a function of knee grip portions contiguous to the knee grip portions 173 and 174. The width B3 between rear portions of the front curved portions 181 and 182 is made substantially as large as the distance B1 between the knee grip portions 173 and 174 so that mud spattered by the rear wheel 12 can be eliminated.

FIG. 22 is a sectional view taken along line 22—22 of FIG. 21. The saddle 166 includes a saddle base 171 made of a resin material, a reinforcement plate 186 made of a resin material and mounted at a central portion of a lower face of the saddle base 171, e.g., by a bolt 185, a stay 192 made of a steel material and having a rear end inserted in a groove 187 provided at a rear portion of the reinforcement plate 186 and a front portion mounted on a projection 188, which is projected to a lower face of the saddle base 171, e.g., by a bolt 191. A pair of cylinder halves 193 and 194 for holding the stay 192 from above and below, a saddle post 197 and a nut member 198 connected to each other by a bolt 196 for further holding the cylinder halves 193 and 194 from above and below, and a support member 176 extending between the extension 163 described hereinabove and the projection 188 of the saddle base 171 are also provided.

The saddle base 171 has flexibility to augment the comfort of the driver, e.g., a cushion member 199 is disposed on the outer face of the saddle base 171, and the outer surface of the cushion member 199 is covered with the skin member 172 described hereinabove. The reinforcement plate 186 is provided at a central portion of the saddle base 171 to raise the rigidity so that the driver's weight can be supported sufficiently. The cylinder halves 193 and 194 allow adjustment of the inclination in the forward and backward direction of the saddle base 171 side with respect to the saddle post 197 by loosening the bolt 196.

The support member 176 has a horseshoe-shaped transverse section and is secured at a front end thereof to the inner side of the extension 163 by a bolt 203 while it is secured at a rear end thereof to the projection 188 of the saddle base 171 together with the stay 192 by means of the bolt 191. The rear fender 164 is mounted on the side walls of the saddle base 171 by means of screws 204. It is to be noted that the saddle may also be configured such that the bottom plate of the saddle extends in a rearward direction of the bicycle body and the opposite side portions of a rear portion of the saddle are projected downward to form knee grip portions such that the knee grip portions are provided integrally on the saddle.

The present invention exhibits one or more of the following beneficial effects. Since the driver can hold the knee grip portions between the inner sides of the knees and the inner parts of his thighs during running of the bicycle, the driver can support the bicycle at the handle bar and the pedals as well as the knee grip portions. In addition, the driver can augment the stability of the bicycle and can maintain a good posture.

If the saddle is configured such that the knee grip portions are formed integrally with the seat face, the number of parts of the saddle can be reduced and the cost of the saddle can be reduced. Further, the saddle on which the knee grip portions are integrally formed integrally can be readily produced. If the saddle for a bicycle is configured such that the knee grip portions are formed as separate members from the saddle body, the knee grip portions can be removed when necessary, and the operability of the saddle can be improved. Further, the knee grip portions can be readily mounted on an existing saddle, which includes only a seat face.

The saddle for a bicycle may include a panel member on which a rear extension extends in a rearward direction, and a pair of left and right lower projecting portions extending downward from the opposite side portions of a front portion of the rear extension are formed is mounted on a rear portion of a seat face of the saddle. Since the panel member serves both as a rear fender for covering over a rear wheel at the rear extension and knee grips to be held between the inner sides of the knees and the inner parts of the thighs of a driver, the stabilization of the bicycle body by the knee grip portions is provided and splashing of mud, dirt and debris by the rear wheel can be prevented.

The saddle for a bicycle may also include an extension extending downward or obliquely forward and downward from a front end of a seat face of the saddle is provided such that, when a driver assumes a posture of moving his/her hip to a forward direction of a bicycle body from the seat face, the hip or waist is received by a front face of the extension. Therefore, and the hip or waist can be contacted in a face-to-face contacting relationship with the front face of the extension. Consequently, a high pressure can be prevented from acting upon the hip or waist.

If the saddle is configured such that the extension is formed integrally with the seat face, the number of parts of the saddle can be reduced, and the cost of the saddle can be lowered. Further, the saddle on which the extension is formed integrally can be readily manufactured readily. If the saddle is configured such that the extension is formed as a separate member from the saddle body and mounted through a supporting member on a saddle body on which the seat face is provided, the extension can be removed (as desired) and the operability of the saddle can be improved.

If the saddle for a bicycle is configured such that the supporting member is a stay secured to a bottom plate of the saddle body, and the shape of the stay is changed, then the position of the extension can be changed, and the extension can be disposed in accordance with the driver's preference. If the saddle is configured such that the supporting member is formed by extending a bottom plate provided at a bottom portion of the saddle body, the number of parts of the saddle can be reduced, and the cost of the saddle can be reduced.

A driver supporting structure for a bicycle having an extending piece extending upward or obliquely rearward and upward is provided on a body frame, which is forward and downward of a front end of a saddle. When a driver assumes a posture of moving his/her hip to a forward direction of a bicycle body from the seat face, the driver's hip or waist is received by a front face of the extending piece. Therefore, the driver's hip or waist is received by the front face of the extending piece such that the hip or waist can be contacted in a face-to-face contacting relationship with the front face of the extending piece. Consequently, a high pressure can be prevented from acting upon the hip or waist.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle for a bicycle, said saddle comprising:
    a saddle body having an intermediate portion and a rear portion;
    a seat face of said saddle being provided on said saddle body for supporting a driver of said bicycle, said seat face having side faces formed in the intermediate portion of said saddle body;
    a pair of left and right knee grip portions, said side faces of said seat face expanding rearward and downward with respect to the intermediate portion of said saddle body to form the pair of left and right knee grip portions, wherein said knee grip portions permit the drive to hold said knee grip portions between inner sides of the knees and inner parts of the thighs of the driver; and
    a rear extension forming said rear portion and extending continuously and rearwardly from said intermediate portion of said saddle body, wherein said rear extension is a fender for covering a rear wheel of the bicycle.

2. The saddle according to claim 1, wherein said knee grip portions are formed integrally with said seat face as a single piece.

3. The saddle according to claim 2, further comprising:
    a bottom plate being provided at a bottom portion of the saddle; and
    a pair of side walls on the bottom plate, said side walls being provided at the bottom portion of the saddle and extending downward.

4. The saddle according to claim 3, further comprising a cushion member being disposed at side portions of the side walls and being covered with a skin member.

5. The saddle according to claim 1, wherein said knee grip portions are formed as separate members from the saddle body.

6. The saddle according to claim 1, further comprising:
    a bottom plate being provided at a bottom portion of the saddle; and
    a pair of side walls on the bottom plate, said side walls being provided at the bottom portion of the saddle and extending downward.

7. The saddle according to claim 6, further comprising a cushion member being disposed at side portions of the side walls and being covered with a skin member.

8. The saddle according to claim 1, wherein said rear extension is integrally provided with said intermediate portion and is formed as a separate member from said knee grip portions.

9. The saddle according to claim 1, wherein said rear extension is formed integrally with said knee grip portions as a single piece.

10. The saddle according to claim 1, wherein said rear extension is formed as a separate member from said saddle body and is mounted through a supporting member on the saddle body.

11. The saddle according to claim 10, wherein said supporting member is a stay secured to a bottom plate of said saddle body.

12. The saddle according to claim 10, wherein said supporting member is formed by extending a bottom plate provided at a bottom portion of said saddle body.

13. The saddle according to claim 1, wherein said saddle body is provided with front curved portions at front portions of said fender.

14. The saddle according to claim 13, wherein said front curved portions are substantially as large as a distance extending between said knee grip portions.

15. The saddle according to claim 1, wherein said knee grip portions are in parallel with respect to a longitudinal direction of the saddle.

* * * * *